United States Patent
Wetterwald et al.

(10) Patent No.: US 11,036,571 B2
(45) Date of Patent: Jun. 15, 2021

(54) REPAIR WALKER AGENTS IN A NETWORK

(71) Applicant: Cisco Technology, Inc., San Jose, CA (US)

(72) Inventors: Patrick Wetterwald, Mouans Sartoux (FR); Pascal Thubert, La Colle sur Loup (FR); Eric Levy-Abegnoli, Valbonne (FR); Jean-Philippe Vasseur, Saint Martin d'uriage (FR)

(73) Assignee: Cisco Technology, Inc., San Jose, CA (US)

( * ) Notice: Subject to any disclaimer, the term of this patent is extended or adjusted under 35 U.S.C. 154(b) by 687 days.

(21) Appl. No.: 15/825,248

(22) Filed: Nov. 29, 2017

(65) Prior Publication Data

US 2019/0163548 A1    May 30, 2019

(51) Int. Cl.
  *G06F 11/07*  (2006.01)
  *H04L 29/08*  (2006.01)
  (Continued)

(52) U.S. Cl.
  CPC ...... *G06F 11/0709* (2013.01); *G06F 11/0754* (2013.01); *G06F 13/14* (2013.01);
  (Continued)

(58) Field of Classification Search
  CPC ... H04B 17/14; H04B 17/309; G06F 11/0709; G06F 11/0754; G06F 9/5027;
  (Continued)

(56) References Cited

U.S. PATENT DOCUMENTS 5,603,031 A * 2/1997 White ............... G06F 9/465
                                                719/317
6,009,456 A * 12/1999 Frew ................ H04L 29/06
                                                709/202

(Continued)

FOREIGN PATENT DOCUMENTS

CN    102255959 A  * 11/2011
CN    101848478 B  * 11/2012

(Continued)

OTHER PUBLICATIONS

F. Ducatelle, G. Di Caro and L. M. Gambardella, "Ant agents for hybrid multipath routing in mobile ad hoc networks," Second Annual Conference on Wireless On-demand Network Systems and Services, St. Moritz, Switzerland, 2005, pp. 44-53, doi: 10.1109/WONS.2005.3. (Year: 2005).*

(Continued)

*Primary Examiner* — James R Sheleheda
(74) *Attorney, Agent, or Firm* — Behmke Innovation Group LLC; Kenneth J. Heywood; Jonathon P. Western

(57) ABSTRACT

In one embodiment, a supervisory device in a network receives a help request from a first node in the network indicative of a problem in the network detected by the first node. The supervisory device identifies a second node in the network that is hosting a repair walker agent able to address the detected problem. The supervisory device determines a network path via which the second node is to send repair walker agent to the first node. The supervisory device instructs the second node to send the repair walker agent to the first node via the determined path.

13 Claims, 15 Drawing Sheets

(51) Int. Cl.
| | |
|---|---|
| *H04B 17/309* | (2015.01) |
| *H04L 29/06* | (2006.01) |
| *G06F 9/50* | (2006.01) |
| *G06F 15/16* | (2006.01) |
| *G06F 13/14* | (2006.01) |
| *H04B 17/14* | (2015.01) |
| *H04L 12/24* | (2006.01) |

(52) U.S. Cl.
CPC ............. *G06F 15/16* (2013.01); *H04B 17/14* (2015.01); *H04B 17/309* (2015.01); *H04L 41/00* (2013.01); *H04L 67/1046* (2013.01); *H04L 69/22* (2013.01); *G06F 9/5027* (2013.01); *G06F 9/5066* (2013.01); *H04L 67/1042* (2013.01); *H04L 67/12* (2013.01)

(58) Field of Classification Search
CPC ... G06F 9/5066; G04L 41/00; H04L 67/1046; H04L 67/1042; H04L 67/12; H04L 59/22
See application file for complete search history.

(56) References Cited

U.S. PATENT DOCUMENTS

| | | | | |
|---|---|---|---|---|
| 6,148,327 | A * | 11/2000 | Whitebread | G06F 9/4862 709/202 |
| 6,308,208 | B1 * | 10/2001 | Jung | G06F 11/3006 709/201 |
| 6,336,139 | B1 * | 1/2002 | Feridun | G06F 9/542 709/202 |
| 6,460,070 | B1 * | 10/2002 | Turek | G06F 11/0709 709/202 |
| 6,466,963 | B1 * | 10/2002 | Shigemori | G06F 9/4862 709/202 |
| 6,473,761 | B1 * | 10/2002 | Shigemori | G06F 9/4862 709/202 |
| 6,549,932 | B1 * | 4/2003 | McNally | G06F 9/4862 709/202 |
| 6,553,403 | B1 * | 4/2003 | Jarriel | H04L 41/048 709/202 |
| 6,681,243 | B1 * | 1/2004 | Putzolu | H04L 29/06 709/202 |
| 6,735,702 | B1 * | 5/2004 | Yavatkar | G06F 21/554 713/190 |
| 7,254,608 | B2 | 8/2007 | Yeager et al. | |
| 7,472,094 | B2 | 12/2008 | Hamadi et al. | |
| 9,503,470 | B2 | 11/2016 | Gertner et al. | |
| 9,515,914 | B2 * | 12/2016 | Vasseur | H04L 45/42 |
| 9,753,796 | B2 | 9/2017 | Mahaffey et al. | |
| 10,469,563 | B2 * | 11/2019 | Levy-Abegnoli | H04L 45/44 |
| 10,630,533 | B2 * | 4/2020 | Thubert | H04L 41/0853 |
| 10,721,630 | B2 * | 7/2020 | Thubert | G05D 1/0274 |
| 10,771,531 | B2 * | 9/2020 | Levy-Abegnoli | H04L 67/04 |
| 2001/0029526 | A1 * | 10/2001 | Yokoyama | G06F 9/4862 709/218 |
| 2002/0034942 | A1 * | 3/2002 | Khreisat | H04L 41/048 455/423 |
| 2003/0140165 | A1 * | 7/2003 | Chiu | H04L 45/02 709/238 |
| 2005/0015435 | A1 * | 1/2005 | Johnson | H04W 24/00 709/202 |
| 2006/0136908 | A1 * | 6/2006 | Gebhart | G06F 9/4856 717/177 |
| 2010/0150019 | A1 * | 6/2010 | Laskowski | H04L 45/26 370/254 |
| 2010/0332630 | A1 * | 12/2010 | Harlow | H04L 41/048 709/221 |
| 2014/0376427 | A1 * | 12/2014 | Hui | H04L 47/245 370/296 |
| 2017/0142135 | A1 | 5/2017 | Shattil et al. | |
| 2018/0314576 | A1 * | 11/2018 | Pasupuleti | G06F 11/3089 |
| 2019/0102159 | A1 * | 4/2019 | Gur | H04L 67/34 |

FOREIGN PATENT DOCUMENTS

| | | | | |
|---|---|---|---|---|
| EP | 1249967 A3 * | 10/2004 | | H04L 43/00 |
| EP | 3133772 A1 * | 2/2017 | | H04L 29/06 |

OTHER PUBLICATIONS

T. Nguyen and C. Bonnet, "A hybrid centralized-distributed mobility management architecture for Network Mobility," 2015 IEEE 16th International Symposium on A World of Wireless, Mobile and Multimedia Networks (WoWMoM), Boston, MA, 2015, pp. 1-9, doi: 10.1109/WoWMoM.2015.7158125. (Year: 2015).*

S. Enyedi, L. Miclea and I. Stefan, "Agent-based testing and repair of heterogeneous distributed systems," 2008 IEEE International Conference on Automation, Quality and Testing, Robotics, Cluj-Napoca, 2008, pp. 104-108, doi: 10.1109/AQTR.2008.4588716. (Year: 2008).*

Y. Wang and W. Qu, "A Framework for the Modeling and Evaluation of the Mobile Agent in Network Fault Management," 2011 Sixth Annual Chinagrid Conference, Liaoning, 2011, pp. 220-226, doi: 10.1109/ChinaGrid.2011.15. (Year: 2011).*

Mouhammd Al-Kasassbeh, Mo Adda, "Analysis of mobile agents in network fault management", Journal of Network and Computer Applications vol. 31, Issue 4, Nov. 2008, pp. 699-711. (Year: 2008).*

* cited by examiner

REPAIR WALKER AGENTS IN A NETWORK

TECHNICAL FIELD

The present disclosure relates generally to computer networks, and, more particularly, to repair walker agents in a network.

BACKGROUND

Low Power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

An example implementation of an LLN is the "Internet of Things" (IoT), which may be used by those in the art to refer to uniquely identifiable objects/things and their virtual representations in a network-based architecture. In particular, the IoT involves the ability to connect more than just computers and communications devices, but rather the ability to connect "objects" in general, such as lights, appliances, vehicles, window shades and blinds, doors, locks, etc. Because of the very limited computing and networking resources of these types of devices, diagnosing and repairing issues involving such devices has become increasingly challenging. Notably, an LLN or IoT device may not even have the memory or processing power to execute the full suite of repair utilities that may be applicable to the device.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
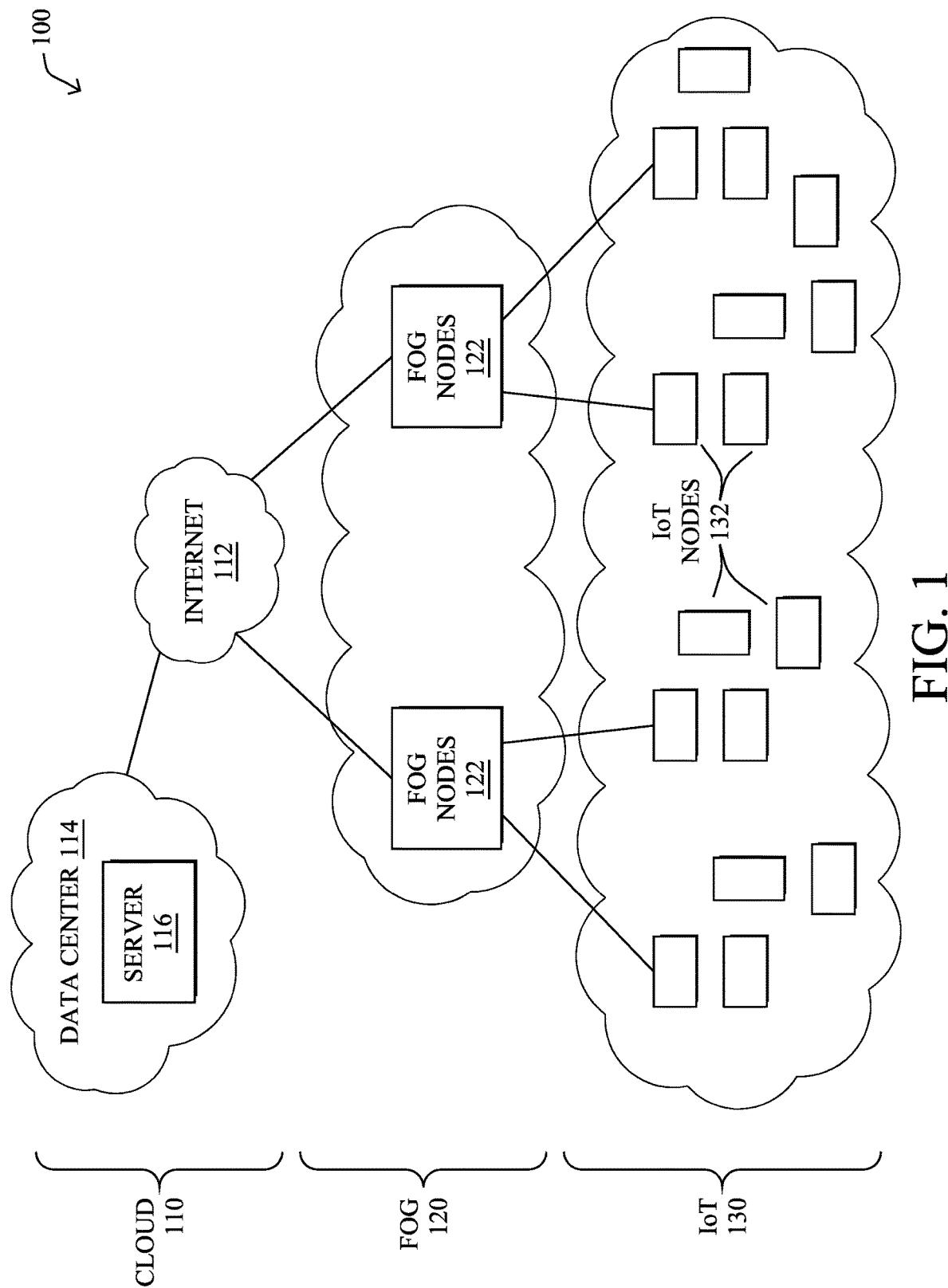
FIG. 1 illustrate an example communication network.

According to one or more embodiments of the disclosure, a supervisory device in a network receives a help request from a first node in the network indicative of a problem in the network detected by the first node. The supervisory device identifies a second node in the network that is hosting a repair walker agent able to address the detected problem. The supervisory device determines a network path via which the second node is to send repair walker agent to the first node. The supervisory device instructs the second node to send the repair walker agent to the first node via the determined path.

In further embodiments, a node in a network detects a problem in the network. The node sends a help request for the detected problem. The node receives a repair walker agent, in response to the help request. The node executes the received repair walker agent, to rectify the detected problem. The node removes the received repair walker agent from memory, after execution of the repair walker agent.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 2:
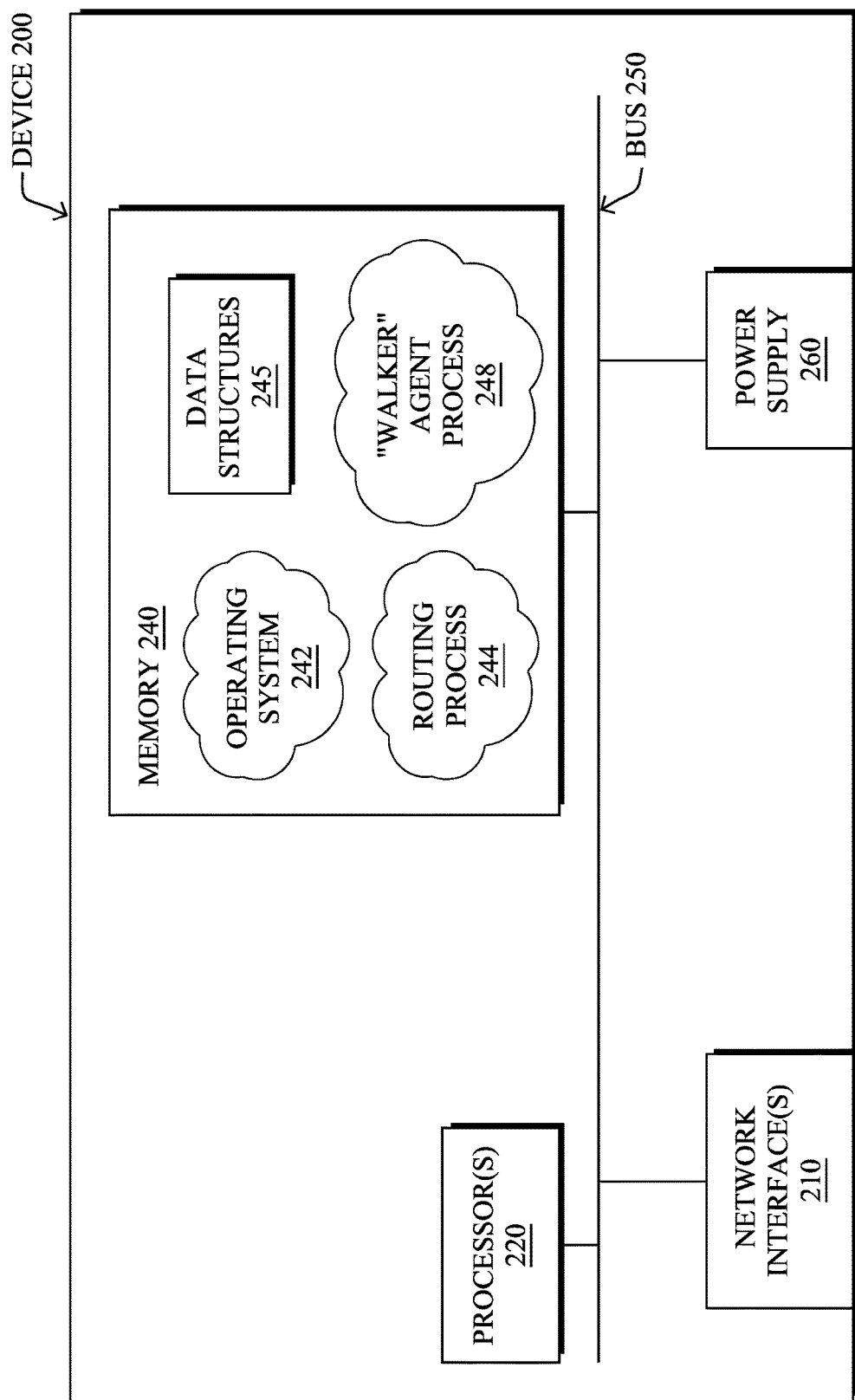
FIG. 2 illustrates an example network device/node.

FIG. 2 is a schematic block diagram of an example computing device/node 200 that may be used with one or more embodiments described herein e.g., as any of the devices shown in FIG. 1 above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration. Also, while the network interface 210 is shown separately from power supply 260, for fog modules using PLC, the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative "walker" agent process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process/services 244 include computer executable instructions executed by processor 220 to perform functions provided by one or more routing protocols, such as an Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN"<draft-ietf-l2vpn-evpn>, introduce a solution for multipoint L2VPN services, with advanced multi-homing capabilities, using BGP for distributing customer/client media access control (MAC) address reach-ability information over the core MPLS/IP network.

Another example protocol that routing process 244 may implement, particularly in the case of LLN mesh networks, is the Routing Protocol for Low Power and Lossy (RPL), which provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

In various embodiments, device 200 may execute a walker agent process 248. As noted above, many devices/nodes in constrained networks, such as LLNs and the IoT, have very limited resources in terms of available memory, processing power, power source (e.g., battery charge, etc.), and the like. Accordingly, such devices may not be able to locally perform many computationally-intensive tasks. This is particularly true in cases in which the processing device/node is required to maintain state information for multiple devices/nodes in the network.

To address the various limitations of constrained devices in certain networks, existing approaches rely on the deployed devices leveraging a more capable device to perform the computations. For example, the devices in the network could offload the computations to a remote server or cloud-based service outside of the local network. However, doing so also increases the amount of bandwidth consumed to relay the information to and from such a server or service (e.g., via a WAN connection). A more recent evolution proposes the use of the local networking devices, such as edge routers, to perform the computations in the "fog."

According to various embodiments, the concept of a "walker agent," such as walker agent process 248, is introduced herein and offers yet another alternative approach to performing more complex computations in a network of constrained devices/nodes. In general, a walker agent refers to a software agent that loads and executes on a particular device/node in a network, updates state information for its computation during execution, passes both its executable code and updated state information to the next device/node in the network for execution, and then unloads/removes its local copy of the agent. In other words, execution of a walker agent "hops" from one device in the network to the next, while maintaining the state information for its computations during these transfers.

FIGS. 3A-3D illustrate examples of a walker agent being passed from one device/node to another in a network. As shown, consider the case of two nodes, node 302a and node 302b, both located in a network 300. In some cases, nodes 302a-302b may be neighboring nodes having a direct communication link there between. In other cases, nodes 302a-302b may be separated by any number of intermediate devices that relay communications between nodes 302a-302b.

During operation, nodes 302a may receive walker agent 304 from another device in the network, such as a neighbor of node 302a, another constrained device along a routing path in the network, or from a supervisory device that provides administrative control over node 302a. In various embodiments, walker agent 304 may comprise executable code 306, as well as state information 308.

Figure 3A:
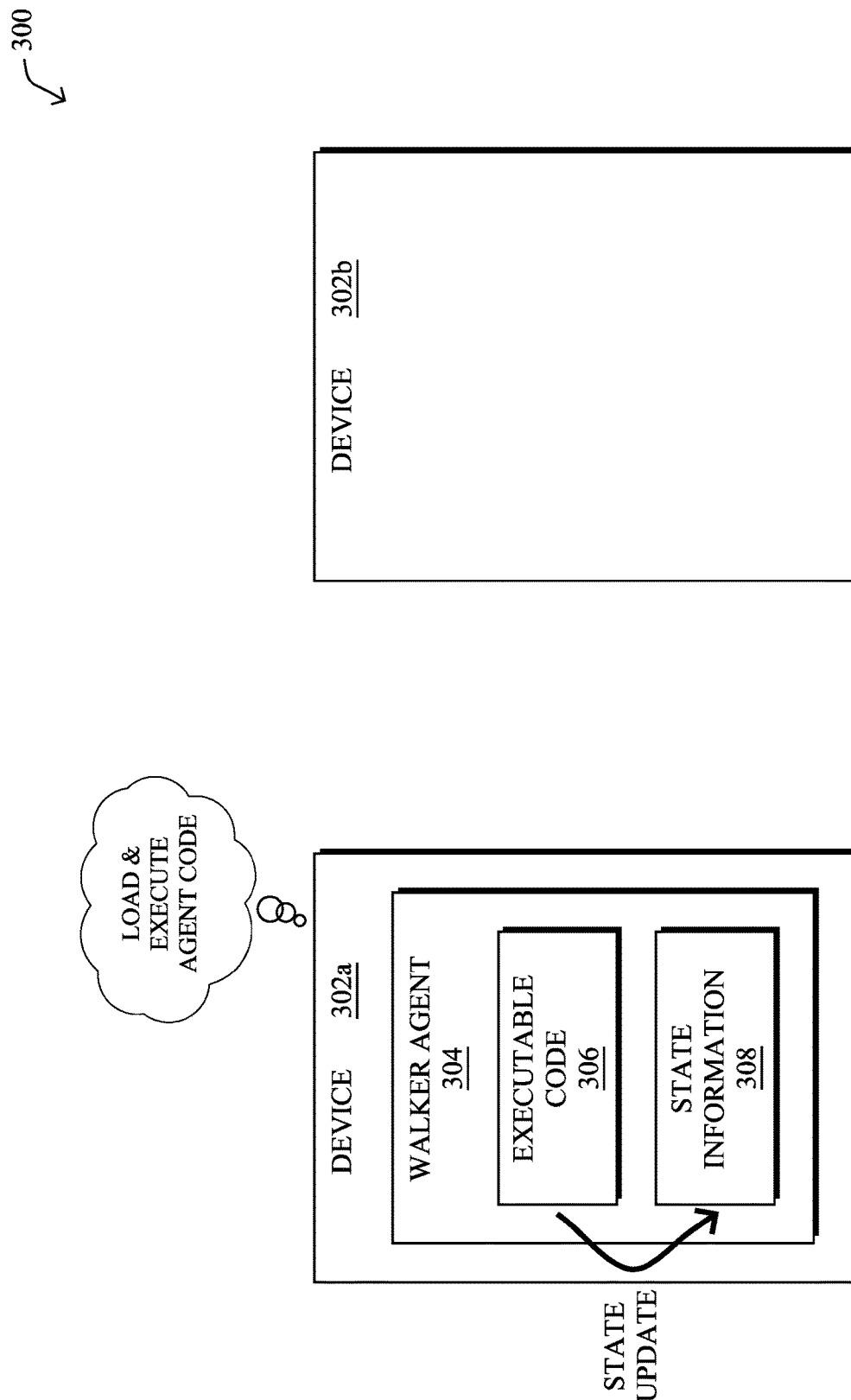
FIGS. 3A-3D illustrate examples of a walker agent being passed from one device/node to another in a network.

As shown in FIG. 3A, node 302a may load executable code 306 which performs a particular computation for which it was configured and updates state information 308, accordingly. Generally, state information 308 may be a set of one or more parameter values that reflect the current state of the computation performed by executable code 306. Such values may be one or more observations about node 302a (e.g., the neighbors of node 302a, the signal strengths to the neighbors, etc.), the portion of network 300 around node 302a, and/or computed values derived therefrom (e.g., averages, statistics, maxima or minima, gradients, etc.).

For example, assume that executable code 306 is configured to calculate an optimal value or running total at each hop or at specific points along a networking path, based on the locally observable value(s) at each device. In such a case, when node 302a receives walker agent 304, it may load and execute executable code 306 of walker agent 304, to retrieve its own locally observable value(s), perform the associated computations on them, and update state information 308, accordingly.

Figure 3B:
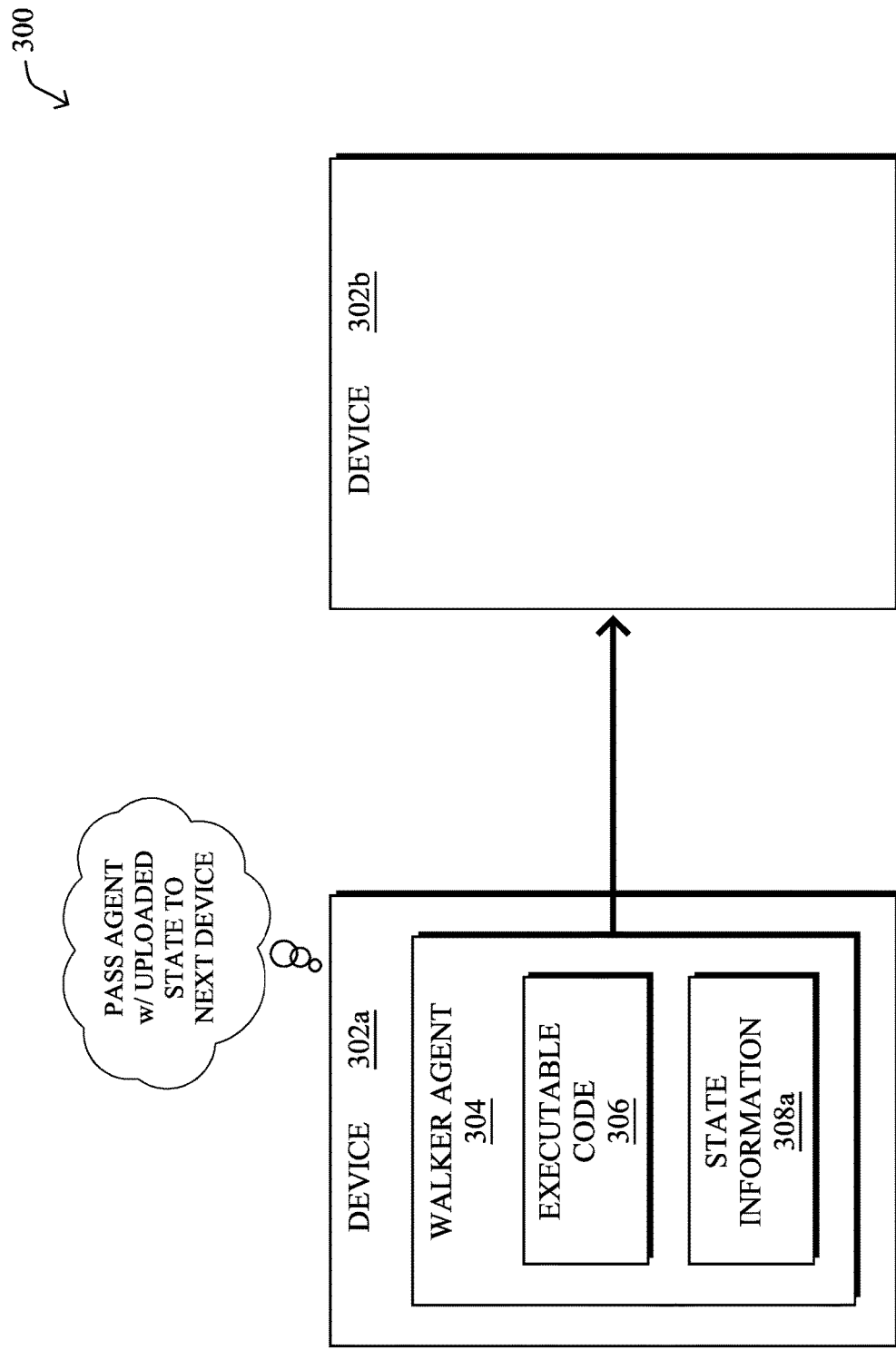
Figure 3C:
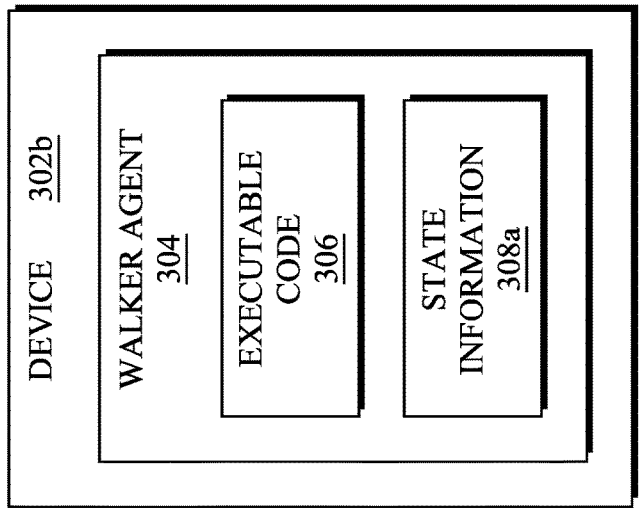
Figure 3C:
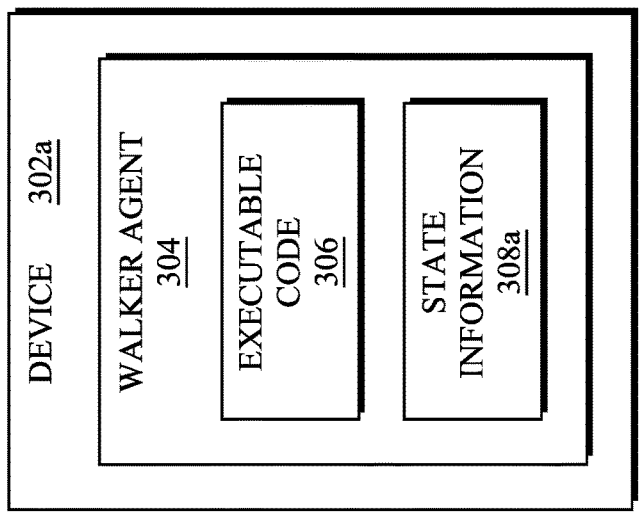

As shown in FIGS. 3B-3C, once node 302a has executed walker agent 304, thereby updating state information 308 into updated state information 308a, node 302a may send walker agent 304 to node 302b. In doing so, when node 302b executes code 306 of walker agent 304, walker agent 304 is able to continue its computation from the point at which it left off on node 302a. In other words, node 302b may then load walker agent 304 and update state information 308a using its own local information. Once completed, node 302b may then send walker agent 304 on to the next device in the network, to repeat the process.

Figure 3D:
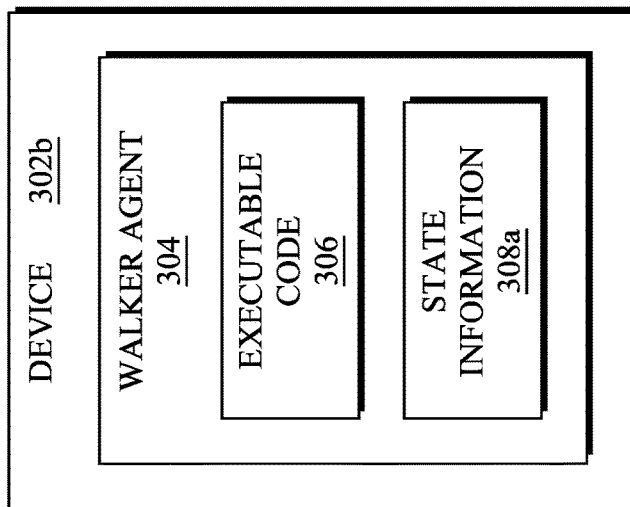
Figure 3D:

In FIG. 3D, another key aspect of a walker agent is that its execution may "hop" from device to device in the network, in various embodiments. Notably, after walker agent 304 has been passed to node 302b, node 302a may unload walker agent 304 from its local system, thereby freeing up resources on node 302a. In some embodiments, this may entail deleting or otherwise removing walker agent 304 from node 302a after walker agent 304 has been passed to node 302b for execution. In other words, at any given time, a walker agent may be executed by a subset of one or more devices in the network that changes over the course of time as the executing device(s) complete their computations.

As noted above, node in an LLN or IoT network are typically very constrained in terms of their available resources (e.g., bandwidth, memory, CPU, battery, etc.). Consequently, there are also implicit constraints on the software that these nodes can execute, as well. For example, in the case of diagnosing and repairing issues at a node, it may not be possible to configure the node with software that covers all of the possible events that may occur during the lifespan of the node. Notably, many things could go wrong at the node and its limited resources may limit its ability to address these problems.

While it may be possible, in some cases, to offload the diagnostics and repair functions from the node to the fog or cloud, repeatedly passing health information from the node to the central entity also consumes resources. For example, each communication may significantly reduce the available bandwidth, battery, and the like, of the node. Further, the large number of nodes in an LLN may be too cumbersome for a central entity to investigate all problems that could be reported.

Repair Walker Agents in a Network

The techniques herein introduce the concept of a repair walker agent that can move/walk from node to node in the network, to provide assistance to a nearby node that requires help. For example, if a given node experiences a problem, it may request assistance. In turn, a repair walker agent stored on one of the neighbors of the node, or nodes in the nearby vicinity of the requesting node, may dispatch the repair walker agent to the node, to perform specific tasks that resolve the problem.

Specifically, according to one or more embodiments of the disclosure as described in detail below, a supervisory device in a network receives a help request from a first node in the network indicative of a problem in the network detected by the first node. The supervisory device identifies a second node in the network that is hosting a repair walker agent able to address the detected problem. The supervisory device determines a network path via which the second node is to send repair walker agent to the first node. The supervisory device instructs the second node to send the repair walker agent to the first node via the determined path.

In further embodiments, a node in a network detects a problem in the network. The node sends a help request for the detected problem. The node receives a repair walker agent, in response to the help request. The node executes the received repair walker agent, to rectify the detected problem. The node removes the received repair walker agent from memory, after execution of the repair walker agent.

Illustratively, the techniques described herein may be performed by hardware, software, and/or firmware, such as in accordance with the walker agent process 248, which may include computer executable instructions executed by the processor 220 (or independent processor of interfaces 210) to perform functions relating to the techniques described herein, e.g., in conjunction with routing process 244.

Operationally, the techniques herein propose using a walker agent mechanism to transport specific diagnostic software to the area or node in the network where the diagnostic must be run. In some embodiments, the agent may have sensory capabilities that attract the repair walker agent to the problem (e.g., a radio disturbance on a channel, etc.). In further embodiments, the agent may be configured to copy itself between two adjacent nodes, to measure a link. In another embodiment, the agent may be configured to leverage local micro-services/application program interfaces (APIs) in the node/device, to gather information. In any case, the walker may perform its specific operation, then package the result within itself, and walk back to the management entity that sent it out in the first place.

Figure 4A:
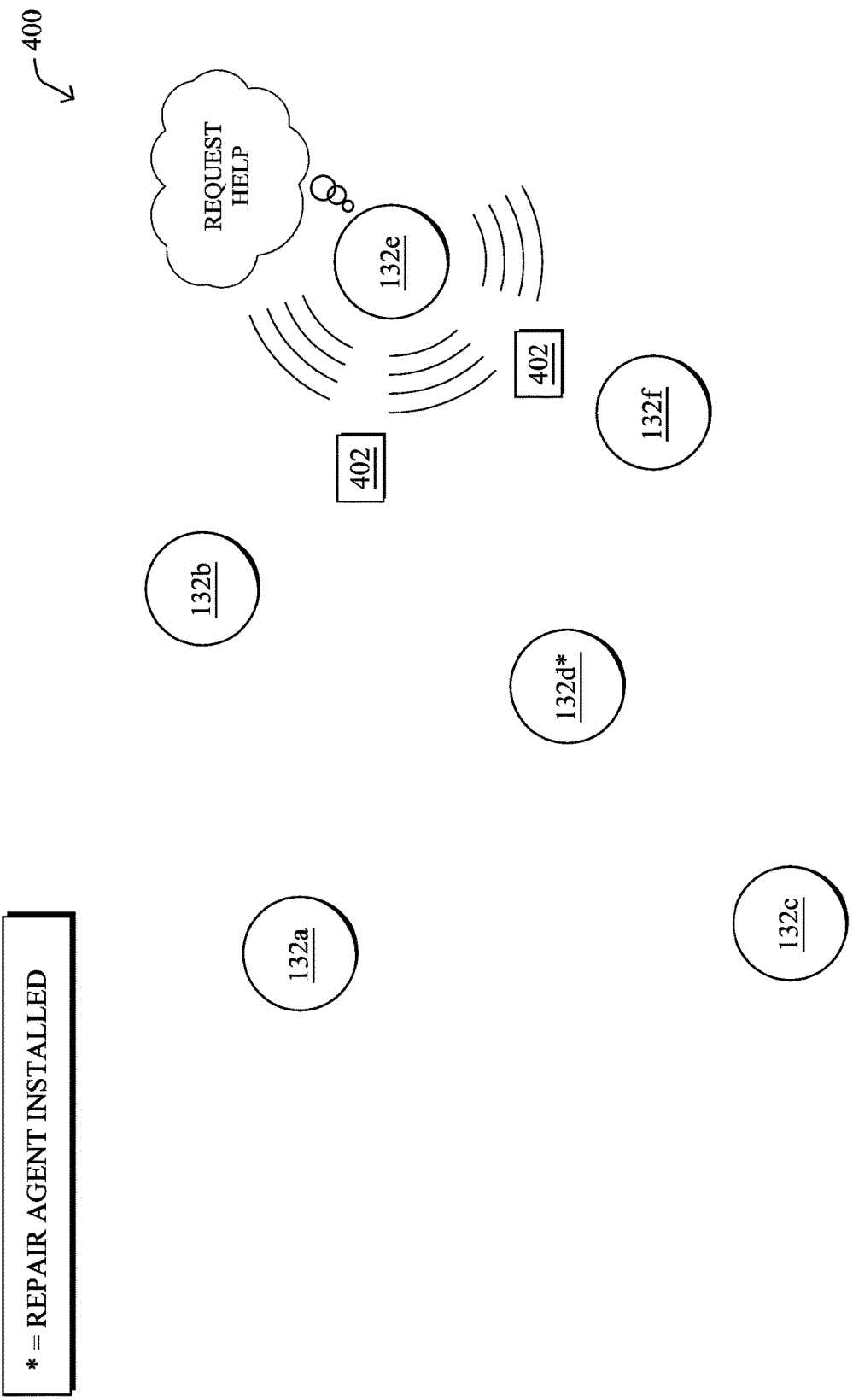
FIGS. 4A-4C illustrate an example of a node requesting a repair walker agent from its neighbors.
Figure 4B:
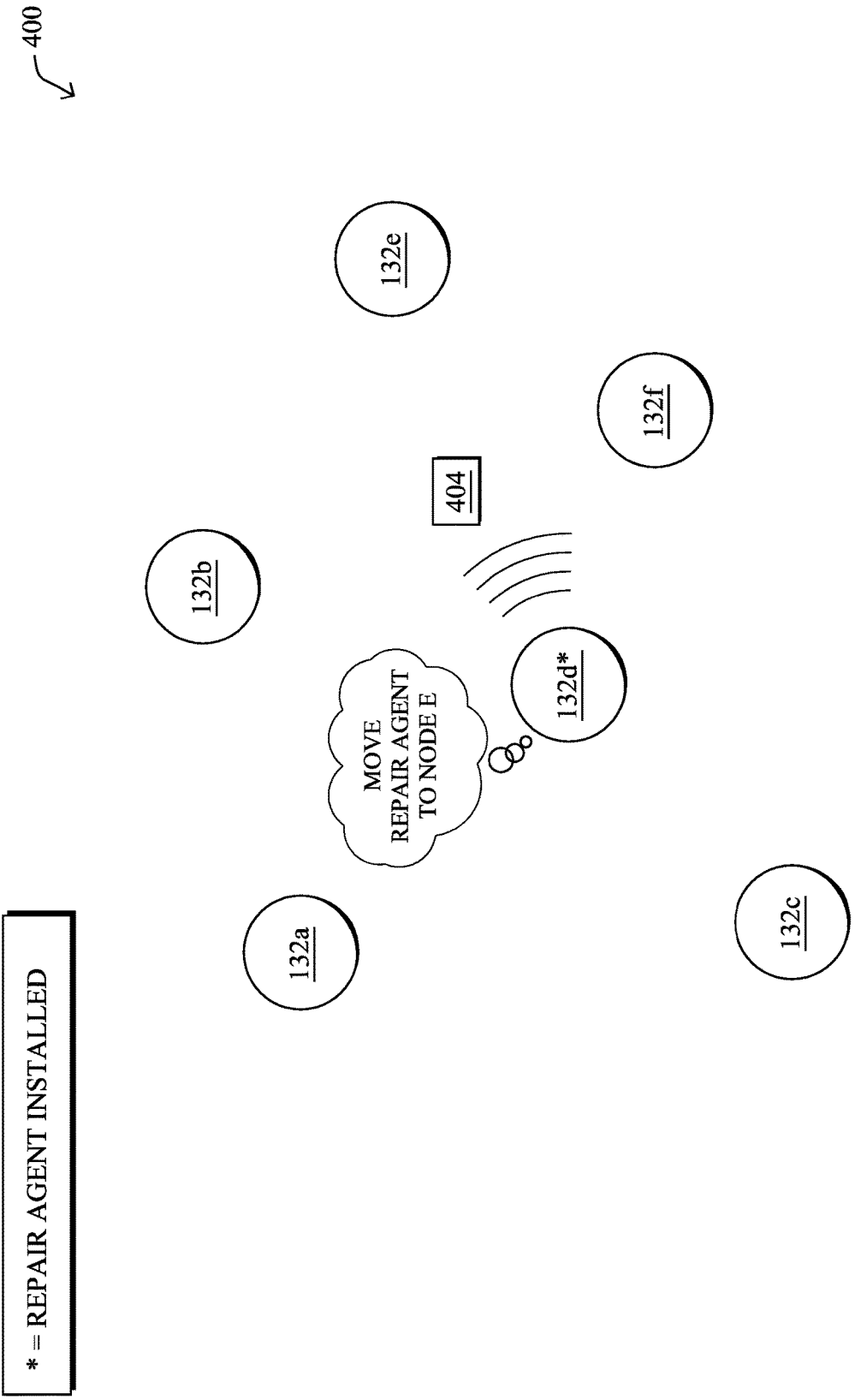
Figure 4C:
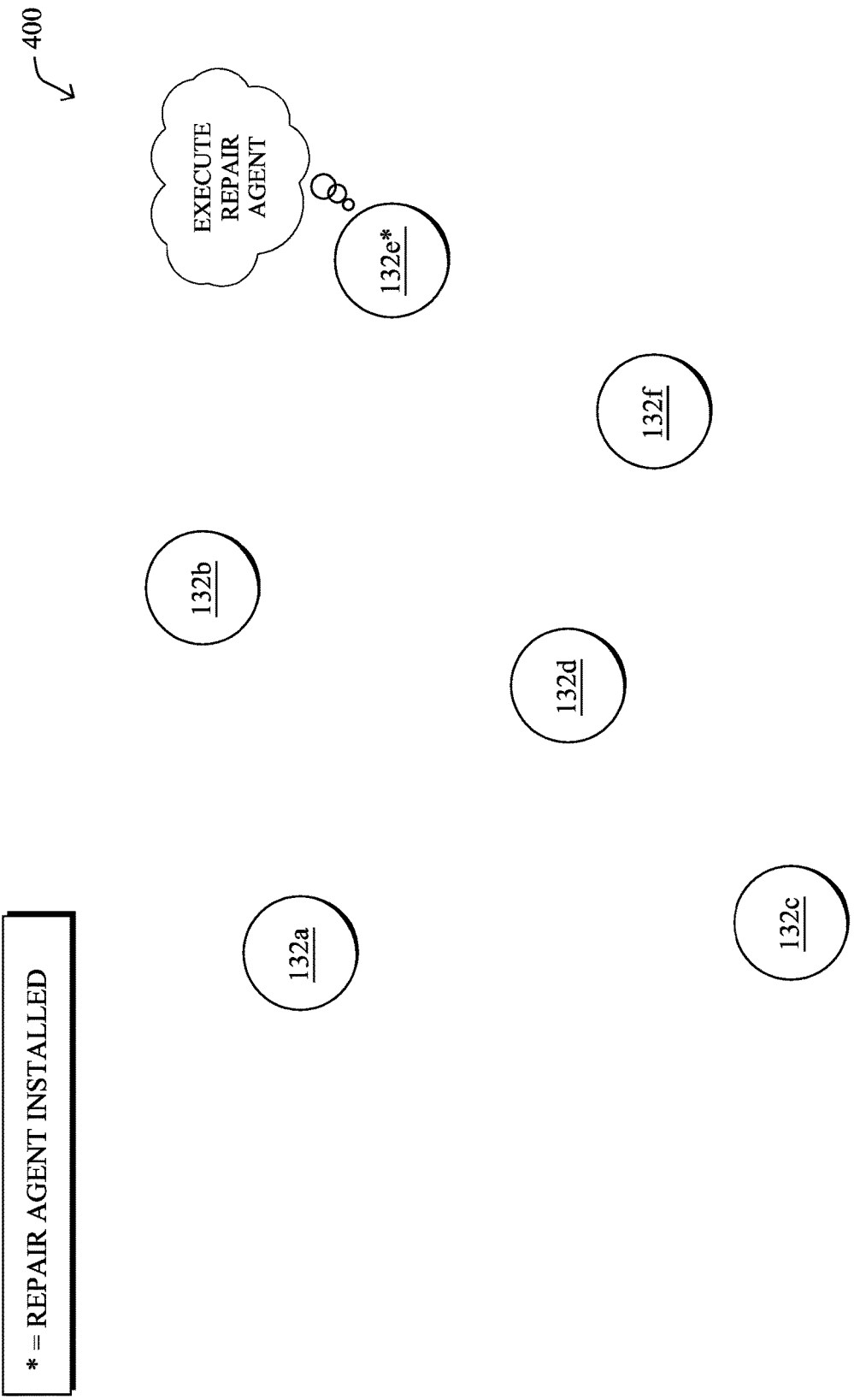

FIGS. 4A-4C illustrate an example of a node requesting a repair walker agent from its neighbors, according to various embodiments. As shown in FIG. 4A, again assume that there are a number of nodes/devices 132a-132f deployed within a network, such as an LLN or IoT network.

Numerous issues may arise during the lifespan of a constrained node, such as, but not limited to the following:
Communication problems, such as flappy connectivity, link instability, etc.
Measurement stability issues, such as measure shifting, clock shift, etc.
Power supply problem.
Calibration problem.

For example, assume that node 132e is experiencing one of the above issues and does not have the requisite diagnostic software installed to deal with the issue. This initial problem detection may be performed by node 132e, or any of its neighbors, using a lightweight diagnostic program that does not have the full ability to fully diagnose or repair the issue. In other words, at the time of error detection, node 132e may not have the corresponding diagnostic code installed.

In various embodiments, repair walker agents may be stored by any number of nodes or supervisory/management entities in the network. For example, assume that node 132d has the requisite resources to store and maintain a repair walker agent capable of handling the condition experienced by node 132e. In response to detecting the error condition, node 132e may send a help request 402 to neighboring nodes within communication range, to request that a repair walker agent be sent. For example, help request 402 may be a custom broadcast message (e.g. using MPL) with a limited range. Generally, request 402 may seek help from those nodes within the vicinity of node 132e, but is not flooded throughout the entire network, in most cases.

As shown in FIG. 4B, node 132d, which has a local copy of the repair walker agent, may receive the help request sent by node 132e. In turn, node 132d may package the repair walker agent as a repair walker agent module 504 and send it to node 132e for loading and execution. In some embodiments, node 132d may select and customize the agent module 504 to the error type reported in help request 402 from node 132e. Thus, rather than installing code that addresses a large number of different error conditions, the repair walker agent sent to node 132e can be scaled down, appropriately.

In FIG. 4C, node 132e may then load and execute the repair walker agent from the received repair walker agent module 404 from node 132d. In some embodiments, the walker agent itself may also ask for help from other types of walkers, based on its own understanding of the problem. For example, if node 132e was experiencing communication problems with node 132f, another repair walker agent may be executed by node 132f to test and potentially repair its communications on its end, as well. In another embodiment, the repair walker agent may duplicate itself, if the specific task necessitates software on both side (e.g., repair of a faulty link between nodes, etc.).

By way of example of operation, assume that the agent shown is configured to update the firmware of its hosting node. In such a case, the problem exhibited by node 132e may be a lack of such an update. In this scenario, the agent may first update the firmware of node 132d. Then, node 132d may pass the agent to node 132e (e.g., via a routing message that includes execution parameters for the agent in the routing header). When executed by node 132e, the agent may then retrieve the installation image from node 132d, in order to update node 132e, as well.

FIGS. 5A-5D illustrate an example of a node requesting a repair walker agent via a supervisory device, in further embodiments. One aspect of the techniques herein, besides running diagnostics, is to rectify the detected problem in the network. In some cases, this may require deployment of a software upgrade to a node. However, multiple downloads of the upgrade, or multicasting the upgrade to a plurality of nodes, may consume too many network resources. Other examples of cases in which multiple downloads or multicasting may not be possible include configuration downloads, certificate downloads, malware signature downloads. Accordingly, in further embodiments, a supervisory device may oversee the movement of a repair walker agent, such as one that causes the executing node to upgrade its software.

As an alternative to the example of FIGS. 4A-4C, in FIGS. 5A-5D, instead of node 132e sending a broadcast help request to nearby nodes, or if such a broadcast request goes unanswered, node 132*e* may send a help request 504 to a supervisory device 502 in the network. Supervisory device 502 may be, for example, a fog node 122, a remote server 116 or service, or a more capable node in the network, such as a network management server (NMS), path computation element (PCE), or the like.

Figure 5A:
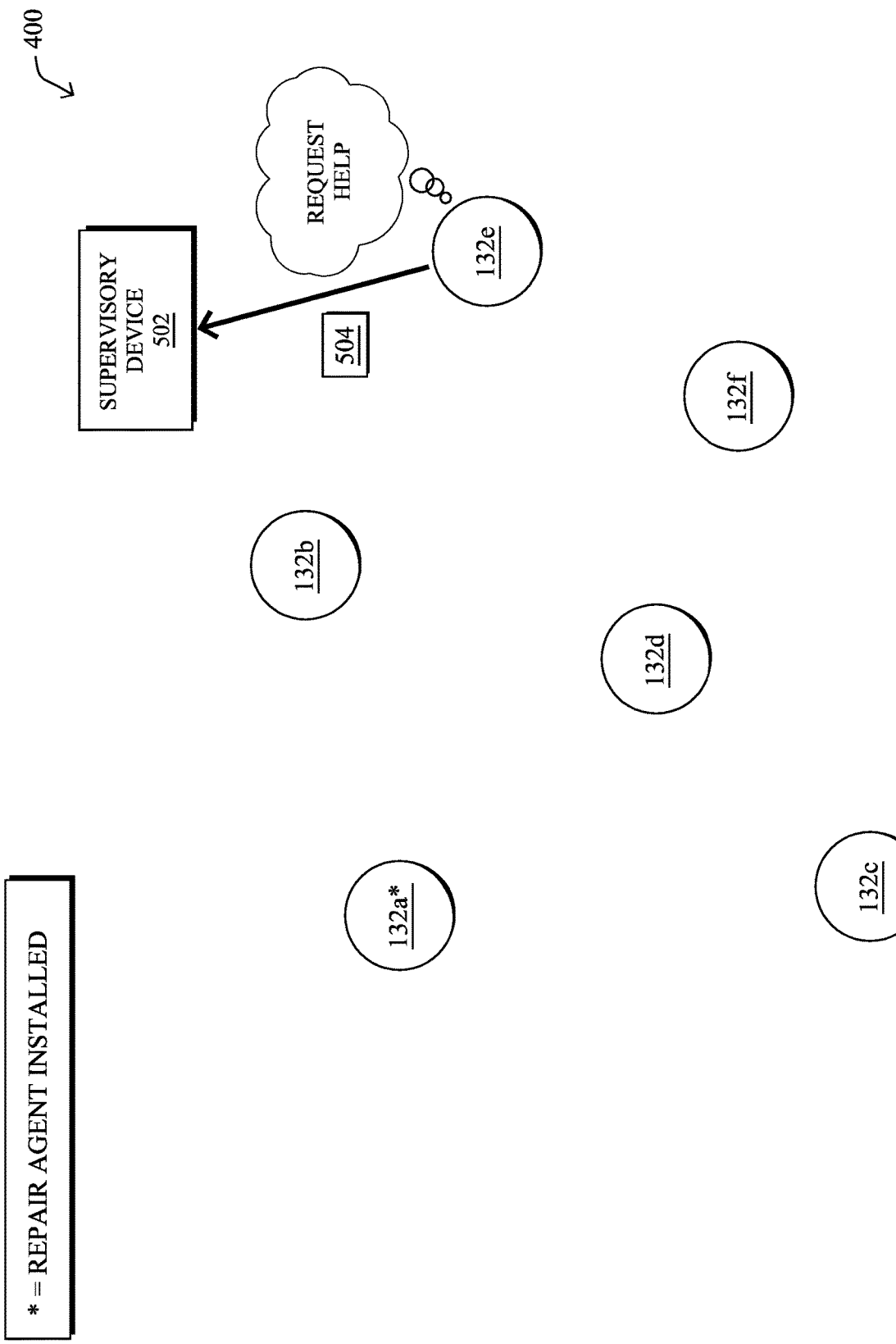
FIGS. 5A-5D illustrate an example of a node requesting a repair walker agent via a supervisory device.
Figure 5B:
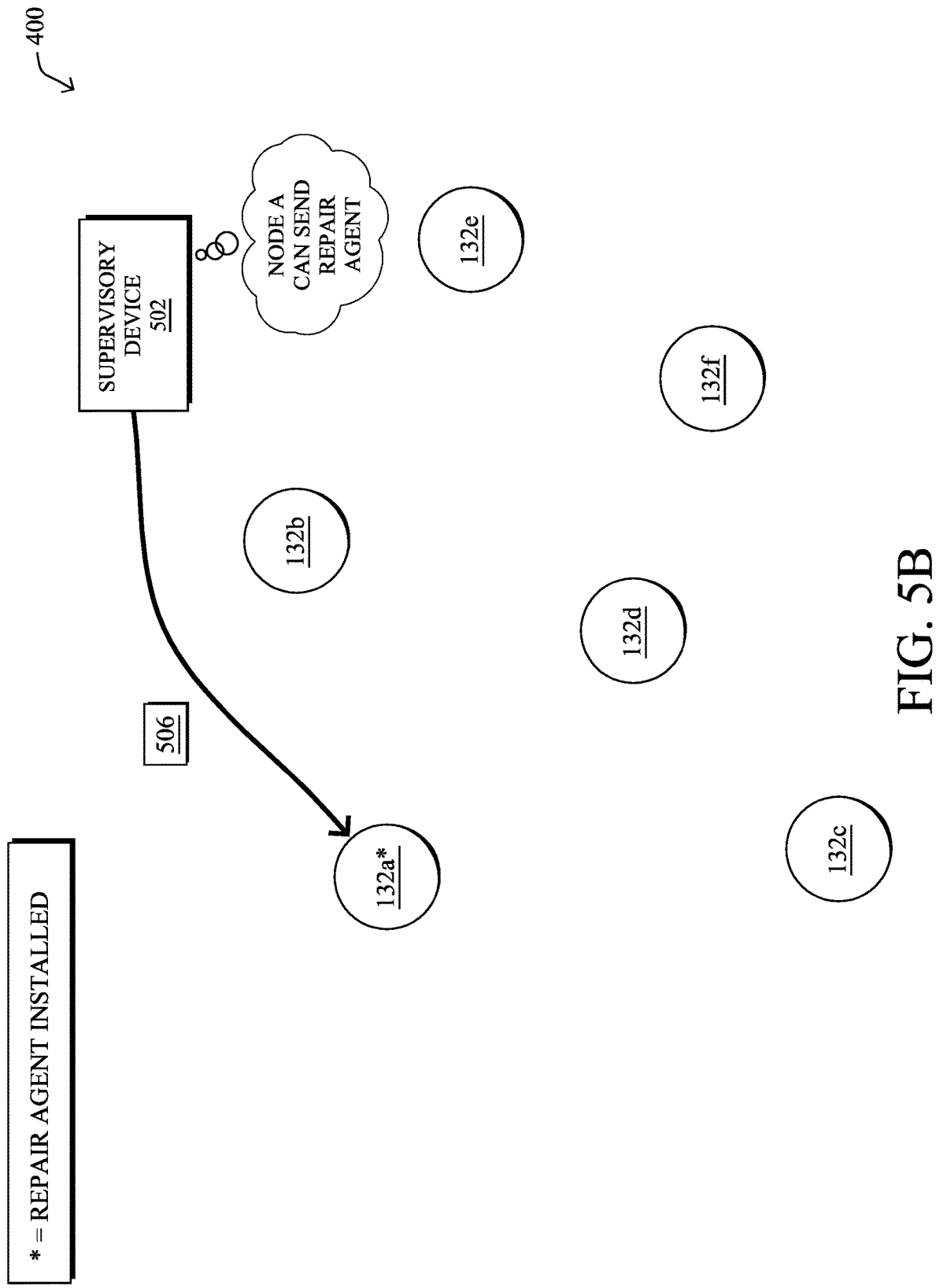
Figure 5C:
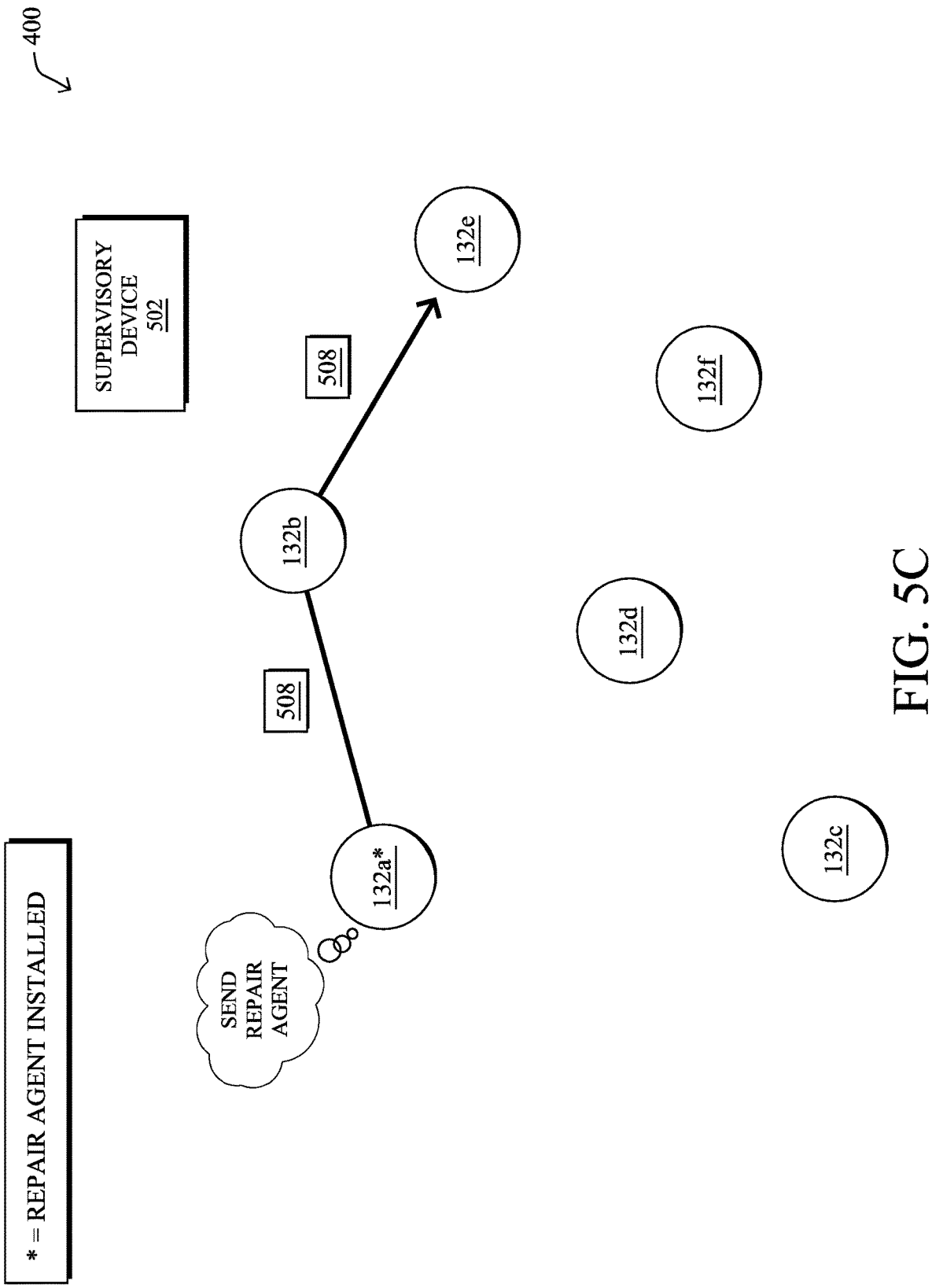

In turn, as shown in FIG. 5B, supervisory device 502 may identify a node 132 that has the appropriate repair walker agent and send an instruction to that node to convey the repair walker agent to the node that needs assistance. For example, assume that node 132*a* has the appropriate repair walker agent for the error condition experienced by node 132*e*. In such a case, supervisory device 502 may send an instruction 506 to node 132*a*, instructing node 132*a* to bundle the appropriate repair walker agent into a module 508 and send it to node 132*e*, as shown in FIG. 5C.

In various embodiments, supervisory device 502 may include a computed route from node 132*a* to node 132*e* in instruction 506. This could be implemented through the use of a source routed feature and could be extended particularly for the distribution of software updates. Instead of using multicast, which does not work well in an LLN environment, or distributing an update using multiple downloads, repair walker agent module 508 can comprise the software update. The list of nodes 132 to be upgraded can then be pre-computed by supervisory device 502 and instruction 506 may instruct node 132*a* to send module 508 along an optimized path between these nodes that the agent will have to update.

In some embodiments, instruction 506 may also include any number of execution parameters for inclusion in a routing header that node 132*a* may use to communicate repair agent module 508 along the selected path to node 132*e*. For example, this extended routing header may include an ordered list optimized for the network path, in combination with the application synchronization requirement (e.g., one node should execute the repair walker agent before another, etc.). By way of example, the execution parameters for inclusion in the routing header may include, but are not limited to, any or all of the following execution commands for a node along the routing path:

Execute the repair walker agent and then delete it from memory

Execute the repair walker agent and then wait for completion

Figure 5D:
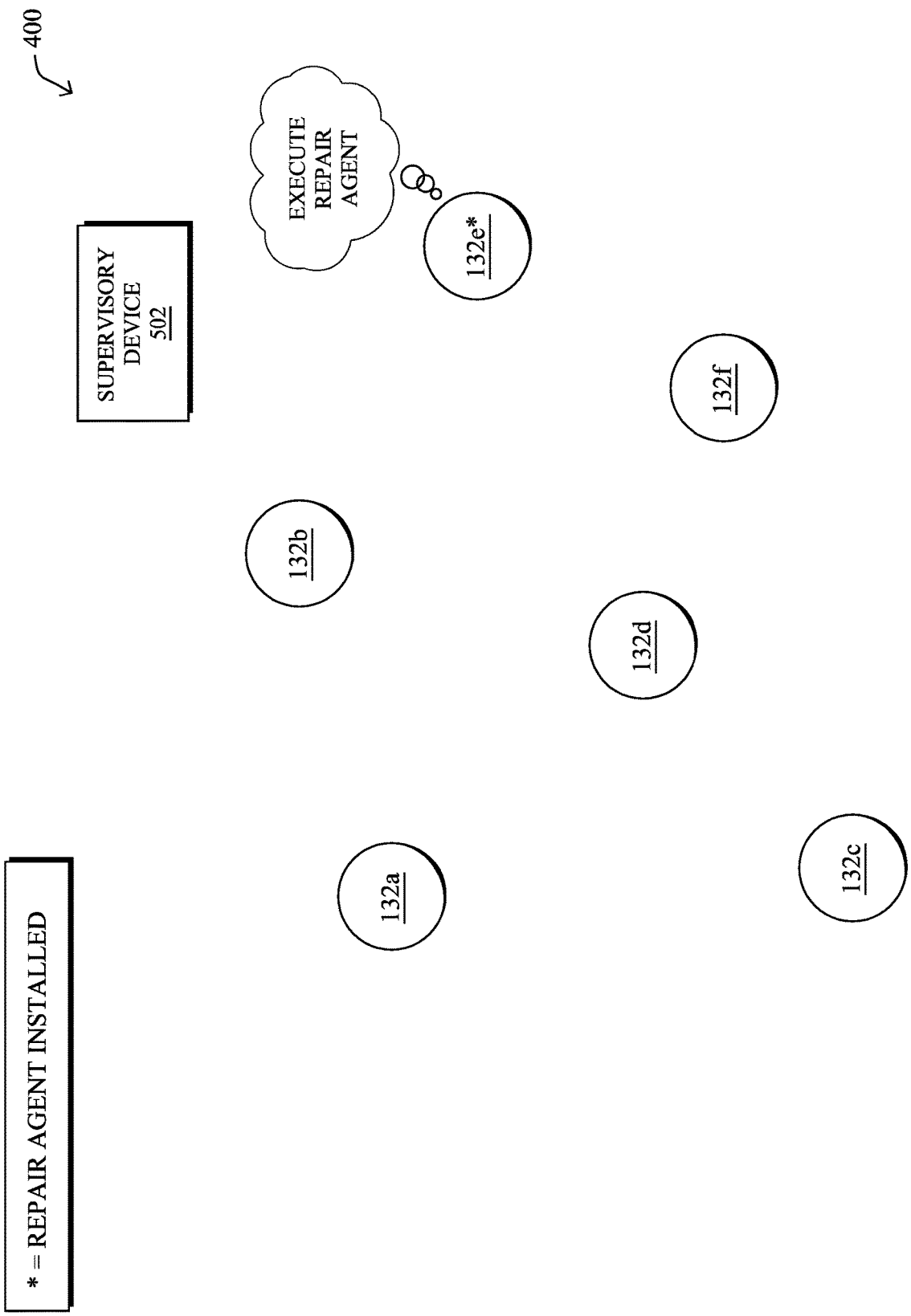

Execute the repair walker agent and send a duplicate of it without waiting for completion Execute the repair walker agent and store the agent for later use by the local node or by another node in the network In FIG. 5D, node 132*e*, in response to receiving repair walker agent module 508, may load and execute the received repair walker agent module 508, to address the error condition. Typically, at some point in time after executing the agent, node 132*e* may remove the repair walker agent from memory, such as by "walking" the agent to another node in the network. However, this behavior may be adjusted, as shown above, via the execution parameters included in the routing header of the communication that conveyed the agent to node 132*e*.

As noted, the routing header of the message sent to propagate the repair walker agent through the network may indicate both the network path to be used and the execution parameters for the walker agent. Assume, for example, that instruction 506 from supervisory device 502 instead indicates that repair walker agent module 508 should traverse the following path: node 132*a*→132*b*→132*c*→132*d*→132*e*.

In addition, assume that instruction 506 also indicates that the routing header for the message conveying repair walker agent module 508 should include execution parameters that cause both nodes 132*c* and 132*e* to execute the agent. More specifically, supervisory device 502 may construct an extended routing header as follows:

Node 132*a*: address; current
Node 132*b*: address; path only
Node 132*c*: address; path and (execute and wait for completion)
Node 132*d*: address; path only
Node 132*e*: address; path and (execute and stay there)

Figure 6:
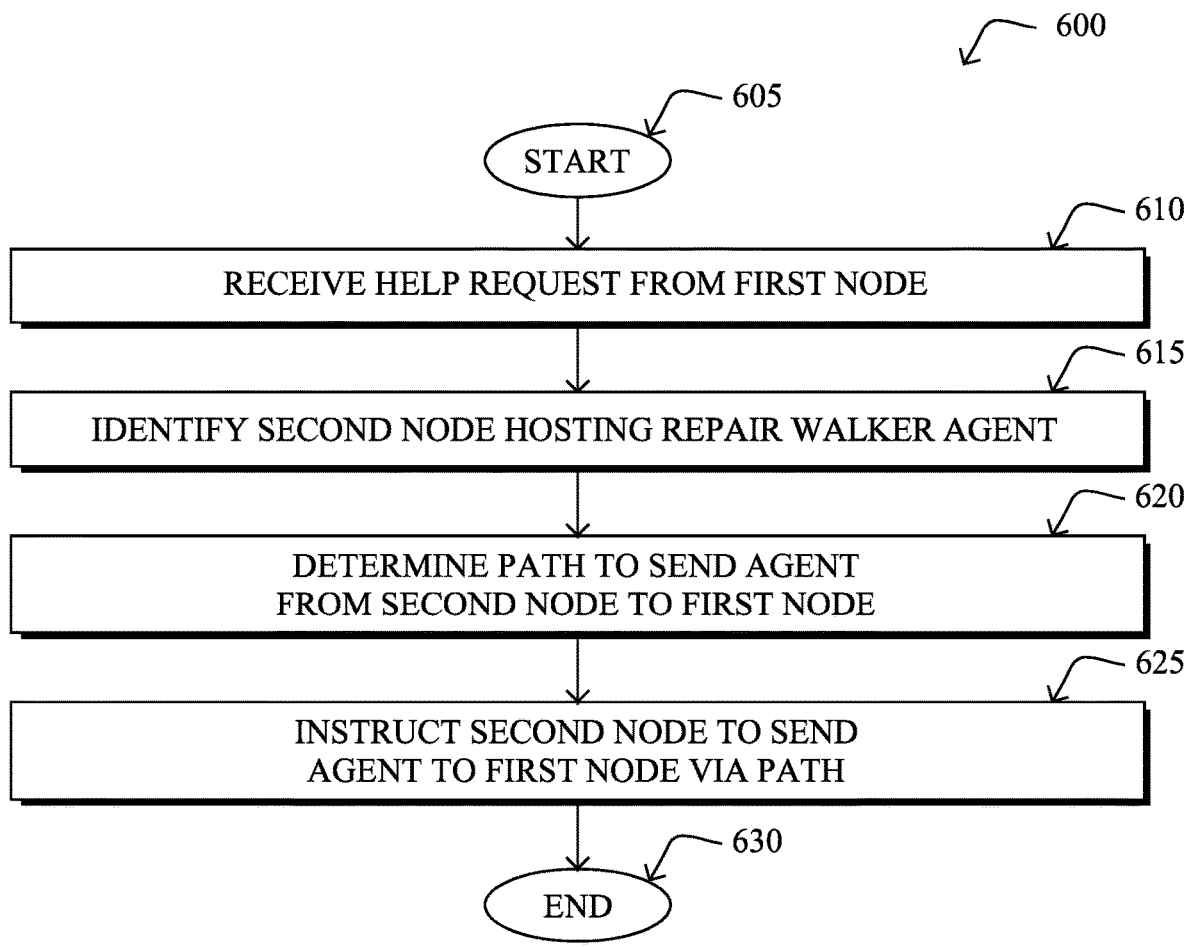
FIG. 6 illustrates an example simplified procedure for sending a repair walker agent to a node.

FIG. 6 illustrates an example simplified procedure for sending a repair walker agent to a node in a network, in accordance with one or more embodiments described herein. For example, a non-generic, specifically configured device (e.g., device 200) may perform procedure 600 by executing stored instructions (e.g., process 248). In various embodiments, the performing device may be a supervisory device in the network, such as an NMS, PCE, LLN root, or the like. The procedure 600 may start at step 605, and continues to step 610, where, as described in greater detail above, the supervisory device may receive a help request from a first node in the network indicative of a problem in the network detected by the first node. For example, the problem may correspond to a link stability problem, a calibration problem, a clock shift problem, a power supply problem, or the like. In various embodiments, the first node may be experiencing the problem itself or, alternatively, may observe the problem in a neighbor of the first node.

At step 615, as detailed above, the supervisory device may identify a second node in the network hosting a repair walker agent able to address the problem. For example, if the reported problem is a link stability issue, the identified repair walker agent may include diagnostics, configuration changes, and/or software updates that are tailored to link stability issues. Similarly, if the reported problem is a power supply issue, the identified repair walker agent may include diagnostics, configuration changes, and/or software updates that are tailored to power supply issues.

At step 620, the supervisory device may determine a network path via which the second node is to send repair walker agent to the first node. For example, if the supervisory device is a PCE, it may determine an ordered list of nodes through which the second node is to send the repair walker agent to the first node. In some embodiments, this listing may include one or more intermediate nodes that are to execute the repair walker agent, upon reception.

At step 625, as detailed above, the supervisory device may instruct the second node to send the repair walker agent to the first node via the determined path. In some embodiments, the instructions may further cause the second node to include execution parameters in a routing protocol header of the message conveying the agent. Such execution parameters may, in turn, signal to the first node and any intermediate nodes receiving the message, whether to execute the agent and how (e.g., by simply deleting the agent after execution, by storing the agent for later use, by sending a copy down the path while executing the agent, etc.). Procedure 600 then ends at step 630.

Figure 7:
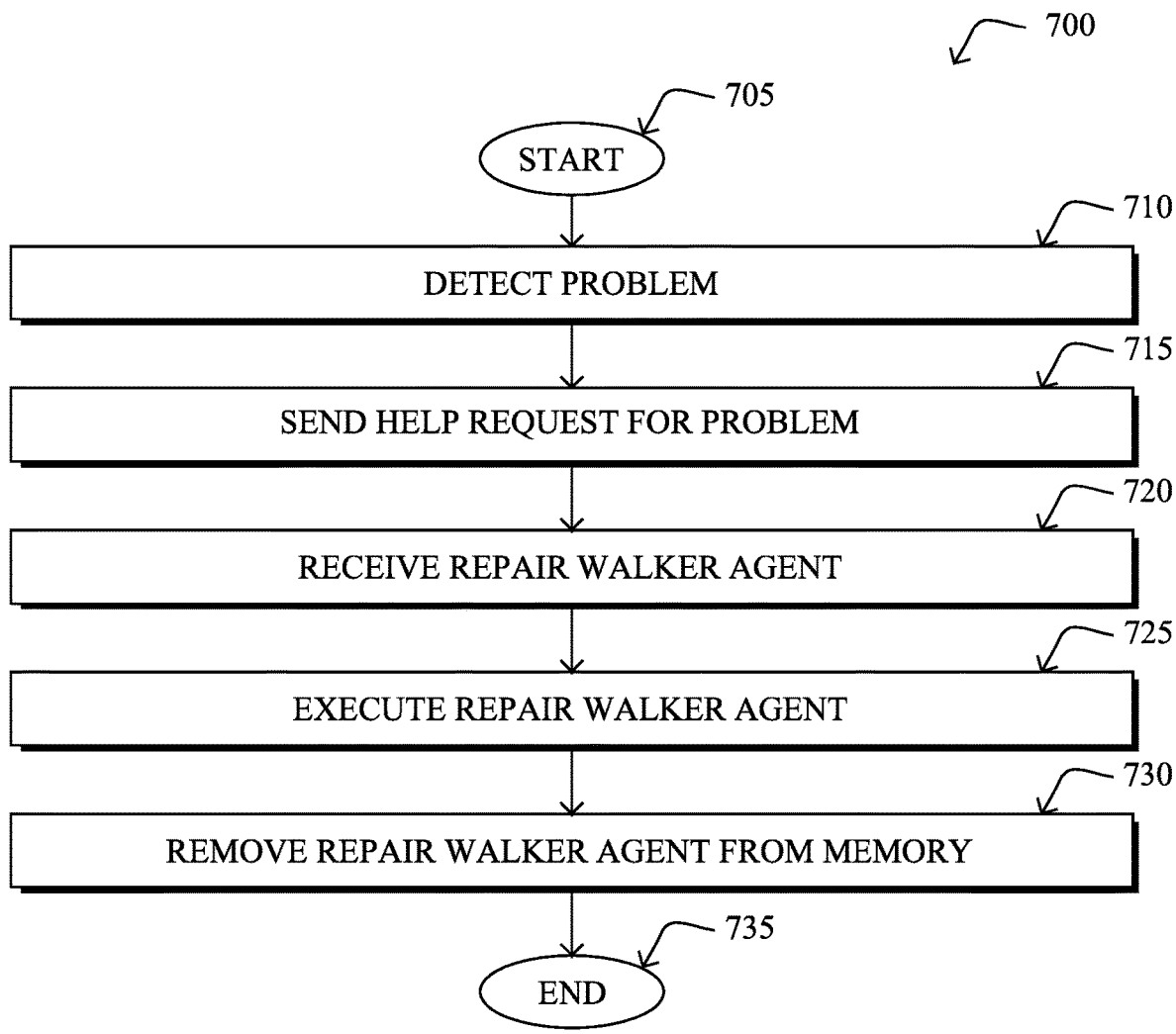
FIG. 7 illustrates an example simplified procedure for executing a repair walker agent.

FIG. 7 illustrates an example simplified procedure for executing a repair walker agent, in accordance with one or more embodiments described herein. For example, a non-generic, specifically configured device (e.g., device 200) may perform procedure 700 by executing stored instructions (e.g., process 248). In various embodiments, the performing device may be a node in the network, such as an LLN or IoT node. The procedure 700 may start at step 705, and continues to step 710, where, as described in greater detail above, the node may detect a problem in the network, either locally or experienced by a nearby neighbor of the node.

At step 715, as detailed above, the node may send a help request for the detected problem. Such a request may indicate, for example, details about the detected problem. In some cases, the node may send the help request only after determining that it does not already have the appropriate diagnostic and repair functions on the local node. In one embodiment, the node may send the help request by broadcasting the request to one or more neighbors of the node, or to other nearby nodes within range of the node. In further embodiments, the node may send the help request to a supervisory device, such as an NMS, PCE, or the like.

At step 720, the node may receive a repair walker agent, in response to the help request, as described in greater detail above. In some case, the neighbor or other nearby node receiving the broadcast help request from the node may send the repair walker agent to the node. In other cases, the supervisory device receiving the help request may package a repair walker agent and send the agent to the node. In further cases, the supervisory device may identify another node hosting the appropriate repair walker agent, determine a path via which that node is to send the agent to the node that requested help, and instruct the hosting node to send the agent to the node that requested help via the path. Such an instruction may further cause the hosting node to send the agent using a routing protocol header that includes execution parameters for use by the node requesting help and/or any other intermediate nodes along the path.

At step 725, as detailed above, the node may execute the received repair walker agent, to rectify the detected problem. In various cases, the repair walker agent may perform diagnostics on the node, and take corrective measures such as modifying a configuration of the executing node, installing software to the node, or the like.

At step 730, the node may remove the received repair walker agent from memory, after execution of the repair walker agent, as described in greater detail above. Notably, in many instances, the node may not have sufficient resources to perpetually store and execute the repair walker agent. In some embodiments, after correction of the problem, the node may delete the agent and report the results of the repair to the sender of the agent or to the supervisory device in the network. In other embodiments, the node may retain the agent for a limited amount of time, until it is instructed to send the agent to another node. Procedure 700 then ends at step 735.

It should be noted that while certain steps within procedures 600-700 may be optional as described above, the steps shown in FIGS. 6-7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-700 are described separately, certain steps from each procedure may be incorporated into each other procedure, and the procedures are not meant to be mutually exclusive.

The techniques described herein, therefore, provide for the use of a repair walker agent in a network. As the agent "walks" between network nodes, resources at both the node level and the network level can be conserved. This may allow repairs to be made, even in networks that have very limited resources, such as LLN and IoT networks.

While there have been shown and described illustrative embodiments that provide for repair walker agents in a network, it is to be understood that various other adaptations and modifications may be made within the spirit and scope of the embodiments herein. For example, while certain embodiments are described herein with respect to using certain protocols, the techniques herein are not limited as such.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:

receiving, at a supervisory device in a network, a help request from a first node in the network, wherein the supervisory device provides administrative control over a plurality of endpoint nodes in the network, wherein the first node is a first endpoint node of the plurality of endpoint nodes, wherein the help request is indicative of a problem detected by the first node and a specific endpoint node of the plurality of endpoint nodes that is experiencing the problem, and wherein the specific endpoint node that is experiencing the problem is a neighbor of the first node which detected the problem;

in response to receiving the help request from the first node, identifying, by the supervisory device, a second node in the network that is hosting a repair walker agent able to address the detected problem, wherein the second node is a second endpoint node of the plurality of endpoint nodes;

determining, by the supervisory device, a network path via which the second node is to send repair walker agent to the first node; and sending, by the supervisory device, an instruction to the second node causing the second node to send the repair walker agent to the first node via the determined path, wherein the instruction comprises an indication of the determined path.

2. The method as in claim 1, further comprising:

instructing the second node to include a routing header in a message that comprises the repair walker agent, wherein the routing header indicates execution parameters for the repair walker agent.

3. The method as in claim 2, wherein the routing header causes an intermediate node between the second node and the first node to execute the repair walker agent before sending the repair walker agent towards the first node.

4. The method as in claim 1, wherein the problem comprises a link stability problem of the specific endpoint node, a calibration problem of the specific endpoint node, a clock shift of the specific endpoint node, a lack of a firmware update, or a power supply problem of the specific endpoint node.

5. A method comprising:
  detecting, by a node in a network, a problem in the network, wherein the node is a first endpoint node of a plurality of endpoint nodes in the network;
  sending, by the node, a help request for the detected problem to a supervisory device that provides administrative control over the plurality of endpoint nodes, wherein the help request is indicative of the problem detected by the node and a specific endpoint node of the plurality of endpoint nodes that is experiencing the problem, and wherein the specific endpoint node that is experiencing the problem is a neighbor of the node which detected the problem;
  receiving, at the node, a repair walker agent, in response to the help request;
  executing, by the node, the received repair walker agent, to rectify the detected problem; and
  removing, by the node, the received repair walker agent from memory, after execution of the repair walker agent,
  wherein the supervisory device:
    in response to receiving the help request from the node, identifies a second node in the network hosting the repair walker agent, wherein the second node is a second endpoint node of the plurality of endpoint nodes;
    determines a network path via which the second node is to send repair walker agent to the node; and
    sends an instruction to the second node causing the second node to send the repair walker agent to the node via the determined path, wherein the instruction comprises an indication of the determined path.

6. The method as in claim 5, wherein the problem comprises a link stability problem of the specific endpoint node, a calibration problem of the specific endpoint node, a clock shift of the specific endpoint node, or a power supply problem of the specific endpoint node.

7. The method as in claim 5, wherein sending the help request comprises:
  sending the help request as a broadcast message to a plurality of neighbors of the node in the network.

8. The method as in claim 5, wherein receiving the repair walker agent comprises:
  receiving a message that includes a routing header that indicates execution parameters for the repair walker agent, and wherein the node uses the execution parameters during execution of the repair walker agent.

9. An apparatus, comprising:
  one or more network interfaces to communicate with a network;
  a processor coupled to the network interfaces and configured to execute one or more processes; and
  a memory configured to store a process executable by the processor, the process when executed configured to:
  receive a help request from a first node in the network, wherein the apparatus provides administrative control over a plurality of endpoint nodes in the network, wherein the first node is a first endpoint node of the plurality of endpoint nodes, wherein the help request is indicative of a problem detected by the first node and a specific endpoint node of the plurality of endpoint nodes that is experiencing the problem, and wherein the specific endpoint node that is experiencing the problem is a neighbor of the first node which detected the problem;
  in response to receiving the help request from the first node, identify a second node in the network that is hosting a repair walker agent able to address the detected problem, wherein the second node is a second endpoint node of the plurality of endpoint nodes;
  determine a network path via which the second node is to send repair walker agent to the first node; and
  send an instruction to the second node causing the second node to send the repair walker agent to the first node via the determined path, wherein the instruction comprises an indication of the determined path.

10. The apparatus as in claim 9, wherein the process when executed is further configured to:
  instructing the second node to include a routing header in a message that comprises the repair walker agent, wherein the routing header indicates execution parameters for the repair walker agent.

11. The apparatus as in claim 10, wherein the routing header causes an intermediate node between the second node and the first node to execute the repair walker agent before sending the repair walker agent towards the first node.

12. The apparatus as in claim 10, wherein the repair walker agent is configured to cause the first node to obtain and install a firmware image from the second node.

13. The apparatus as in claim 9, wherein the process when executed is further configured to:
  receive a notification indicative of whether the execution of the repair walker agent rectified the detected problem.

* * * * *